United States Patent
Khafagy et al.

(10) Patent No.: US 10,793,184 B2
(45) Date of Patent: Oct. 6, 2020

(54) METHODS AND APPARATUS FOR CONTROLLING AN ELECTRONIC POWER ASSISTED STEERING MOTOR IN RESPONSE TO DETECTING ENGINE STALL WHILE RESTARTING AN AUTO STOP-START ENGINE

(71) Applicant: Ford Global Technologies, LLC, Dearborn, MI (US)

(72) Inventors: Hafiz Khafagy, Dearborn, MI (US); Hussam Makkiya, Troy, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 386 days.

(21) Appl. No.: 15/729,027

(22) Filed: Oct. 10, 2017

(65) Prior Publication Data

US 2019/0106145 A1  Apr. 11, 2019

(51) Int. Cl.
*B62D 5/04* (2006.01)
*B62D 6/00* (2006.01)
*F02N 11/08* (2006.01)

(52) U.S. Cl.
CPC ........... *B62D 5/046* (2013.01); *B62D 5/0481* (2013.01); *B62D 6/008* (2013.01); *F02N 11/0814* (2013.01)

(58) Field of Classification Search
CPC ...... B62D 5/046; B62D 6/008; B62D 5/0481; F02N 11/0814
See application file for complete search history.

(56) References Cited

U.S. PATENT DOCUMENTS

| | | | |
|---|---|---|---|
| 7,610,891 B2 * | 11/2009 | Seufert | B60K 6/387 123/179.25 |
| 8,727,067 B2 * | 5/2014 | Gibson | B62D 5/0481 180/446 |
| 8,983,731 B2 * | 3/2015 | Chauvelier | B62D 5/065 180/422 |
| 9,499,195 B2 | 11/2016 | Malone et al. | |
| 9,975,569 B2 * | 5/2018 | Pebley | B62D 5/046 |
| 10,220,875 B2 * | 3/2019 | Jeannin | B62D 5/0469 |
| 2010/0100282 A1 * | 4/2010 | Chapeau | B62D 5/065 701/42 |
| 2012/0330508 A1 | 12/2012 | Pebley et al. | |

(Continued)

FOREIGN PATENT DOCUMENTS

| | | |
|---|---|---|
| DE | 100 50 377 | 4/2001 |
| EP | 2 163 457 | 3/2010 |

(Continued)

*Primary Examiner* — Thomas G Black
*Assistant Examiner* — Tarek Elarabi
(74) *Attorney, Agent, or Firm* — Ray Coppiellie; Hanley, Flight & Zimmerman, LLC

(57) ABSTRACT

Methods and apparatus for controlling an electronic power assisted steering (EPAS) motor in response to detecting engine stall while restarting an auto stop-start engine are described. A controller is to ramp out current from an EPAS motor in response to detecting that an auto stop-start engine is stalled. The controller is also to invoke a stall recovery attempt at the auto stop-start engine in response to the ramp out of current. The controller is also to ramp in current to the EPAS motor in response to detecting that the auto stop-start engine has been successfully restarted based on the stall recovery attempt.

20 Claims, 4 Drawing Sheets

(56) References Cited

U.S. PATENT DOCUMENTS

| | | | | |
|---|---|---|---|---|
| 2016/0200351 A1* | 7/2016 | Malone | ................. | B62D 5/008 |
| | | | | 701/41 |
| 2016/0229403 A1* | 8/2016 | Khafagy | ............... | B60W 30/18 |
| 2017/0203747 A1* | 7/2017 | Khafagy | ............... | B60W 10/06 |
| 2019/0002012 A1* | 1/2019 | Khafagy | ................ | B62D 5/046 |

FOREIGN PATENT DOCUMENTS

| | | |
|---|---|---|
| WO | 2005100777 | 10/2005 |
| WO | 2012085392 | 6/2012 |
| WO | 2016005669 | 1/2016 |

\* cited by examiner

METHODS AND APPARATUS FOR CONTROLLING AN ELECTRONIC POWER ASSISTED STEERING MOTOR IN RESPONSE TO DETECTING ENGINE STALL WHILE RESTARTING AN AUTO STOP-START ENGINE

FIELD OF THE DISCLOSURE

This disclosure relates generally to electronic power assisted steering systems and, more particularly, to methods and apparatus for controlling an electronic power assisted steering motor in response to detecting engine stall while restarting an auto stop-start engine.

BACKGROUND

Modern vehicles (e.g., automobiles) are equipped with auto stop-start engines at an increasing rate. Auto stop-start engines are internal combustion engines including and/or controlled by automated stop-start functionality. The automated stop-start functionality is configured to shut down and/or stop the internal combustion engine when the internal combustion engine begins to idle. The automated stop-start functionality is further configured to re-crank and/or restart (e.g., auto start) the internal combustion engine in response to an indication that the internal combustion engine is no longer intended to be stopped (e.g., as may be indicated by the release of the brake pedal of the vehicle). Stopping the internal combustion engine from operating during the period where the internal combustion engine would otherwise be idling reduces the fuel consumption of the internal combustion engine and/or, more generally, of the vehicle.

Modern vehicles also typically include electronic power assisted steering ("EPAS") systems that provide powered assistance (e.g., power-assisted torque and/or power-assisted momentum) to a steering assembly of the vehicle to increase the ease with which a portion of the steering assembly (e.g., a steering wheel) may be rotated and/or otherwise moved by an occupant (e.g., a driver) of the vehicle. Conventional EPAS systems include an EPAS controller that controls an EPAS motor to provide the above-described powered assistance to the steering assembly. When a conventional EPAS system is implemented in conjunction with an auto stop-start engine, the output of the EPAS motor is typically reduced and/or terminated by the EPAS controller (e.g., by ramping out an input current provided to the EPAS motor) while the auto stop-start engine is auto stopped, thereby resulting in a reduction and/or loss of powered assistance to the steering assembly of the vehicle. Powered assistance to the steering assembly is restored when the output of the EPAS motor is increased and/or resumed by the EPAS controller (e.g., by ramping in the input current provided to the EPAS motor) in connection with the auto stop-start engine being re-cranked and/or restarted (e.g., auto started) subsequent to the auto stop-start engine having been auto stopped.

SUMMARY

Methods and apparatus for controlling an electronic power assisted steering (EPAS) motor in response to detecting engine stall while restarting an auto stop-start engine are disclosed. In some examples, an apparatus is disclosed. In some disclosed examples, the apparatus comprises a controller. In some disclosed examples, the controller is to ramp out current from an EPAS motor in response to detecting that an auto stop-start engine is stalled. In some disclosed examples, the controller is to invoke a stall recovery attempt at the auto stop-start engine in response to the ramp out of current. In some disclosed examples, the controller is to ramp in current to the EPAS motor in response to detecting that the auto stop-start engine has been successfully restarted based on the stall recovery attempt.

In some examples, a method is disclosed. In some disclosed examples, the method comprises ramping out current from an EPAS motor, by executing one or more instructions via a controller, in response to detecting that an auto stop-start engine is stalled. In some disclosed examples, the method comprises invoking a stall recovery attempt at the auto stop-start engine, by executing one or more instructions via the controller, in response to the ramping out of current. In some disclosed examples, the method comprises ramping in current to the EPAS motor, by executing one or more instructions via the controller, in response to detecting that the auto stop-start engine has been successfully restarted based on the stall recovery attempt.

In some examples, a non-transitory machine-readable storage medium comprising instructions is disclosed. In some disclosed examples, the instructions, when executed, cause a controller to ramp out current from an EPAS motor in response to detecting that an auto stop-start engine is stalled. In some disclosed examples, the instructions, when executed, cause the controller to invoke a stall recovery attempt at the auto stop-start engine in response to the ramp out of current. In some disclosed examples, the instructions, when executed, cause the controller to ramp in current to the EPAS motor in response to detecting that the auto stop-start engine has been successfully restarted based on the stall recovery attempt.

Figure 1:
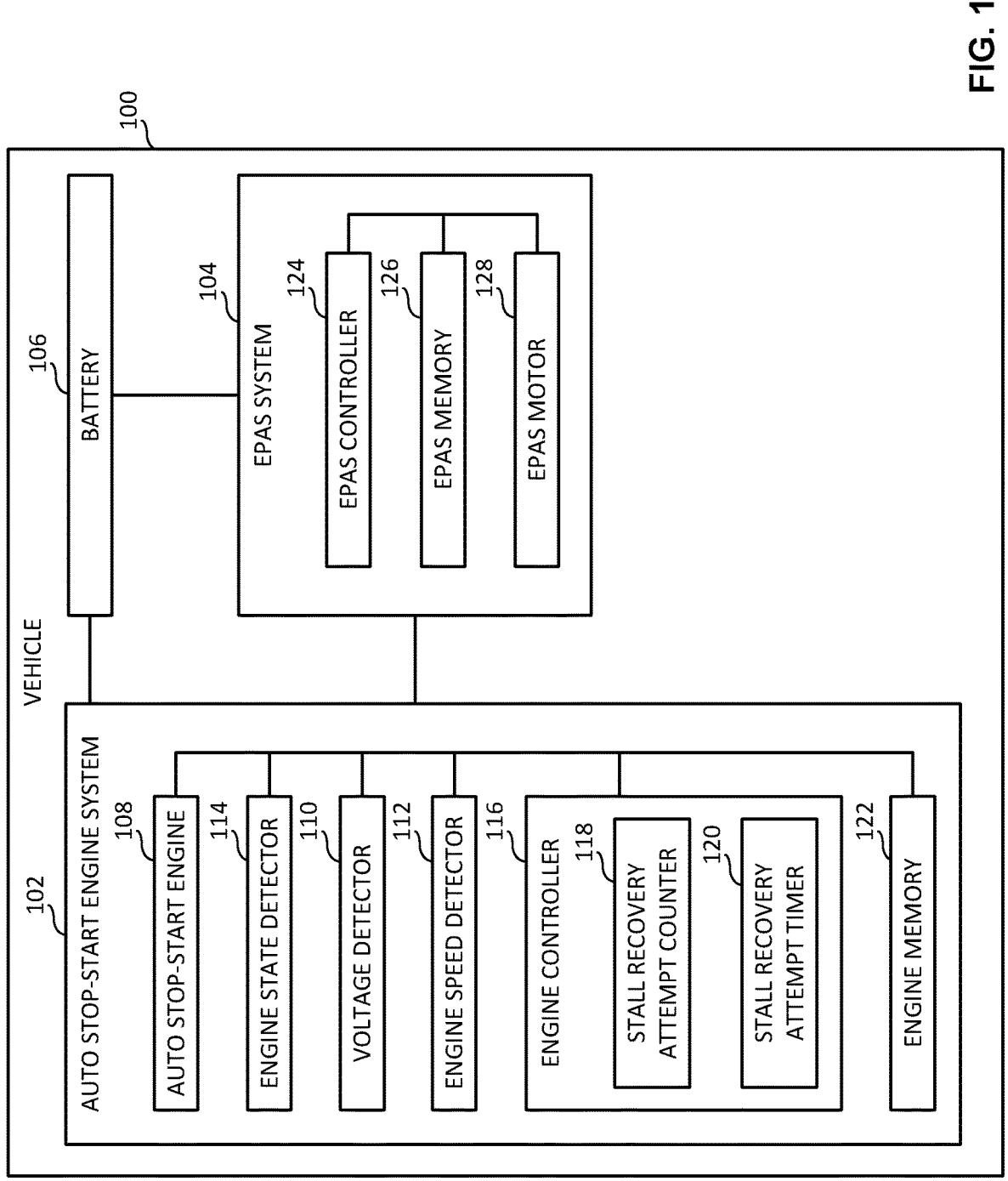
FIG. 1 is a block diagram of an example vehicle including an example auto stop-start engine system constructed in accordance with the teachings of this disclosure.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

DETAILED DESCRIPTION

Auto stop-start engines may stall when attempting to re-crank and/or restart (e.g. auto start) from an auto stopped engine state. Conventional auto stop-start engine systems commonly include a stall recovery feature that causes the auto stop-start engine of the vehicle to make a stall recovery attempt (e.g., an automated attempt at re-cranking and/or restarting the auto stop-start engine) in response to detecting that the auto stop-start engine has stalled. The stall recovery feature may cause the auto stop-start engine of the vehicle to continue making stall recovery attempts until the auto stop-start engine has been successfully restarted, or until the number of unsuccessful stall recovery attempts exceeds a permitted limit, whichever occur first.

The likelihood of successfully restarting the auto stop-start engine in connection with a stall recovery attempt is highly dependent on the amount of stored energy available to drive and/or be consumed by a starter of the vehicle that facilitates the re-cranking and/or restarting of the auto stop-start engine. As the number of stall recovery attempts increases, so too does the amount of stored energy of the vehicle that is consumed by the starter. It is accordingly beneficial to conserve energy from other components and/or systems of the vehicle in preparation for and/or in connection with the stall recovery attempt(s). Conventional EPAS systems consume a substantial amount of stored energy of the vehicle. Suddenly ramping out current from such EPAS systems in an effort to conserve energy, however, may cause voltage flair associated with a battery of the vehicle, and/or may cause steering wheel jerk associated with the steering assembly of the vehicle, both of which typically result in customer (e.g., driver) dissatisfaction.

In comparison to the conventional stall recovery features described above, the methods and apparatus disclosed herein for controlling an EPAS motor in response to detecting engine stall while restarting an auto stop-start engine advantageously increase (e.g., maximize) the stored energy available to be consumed in connection with restarting the stalled auto stop-start engine, while also reducing (e.g., limiting and/or preventing) occurrences of voltage flair and/or steering wheel jerk in connection with the restart. For example, the disclosed methods and apparatus ramp out current from the EPAS motor in response to detecting that the auto stop-start engine has stalled, invoke the stall recovery attempt in response to the ramp out of current (e.g., in response to determining that the ramp out of current is complete), and ramp in current to the EPAS motor in response to detecting that the auto stop-start engine has successfully restarted based on the stall recovery attempt. The amount of stored energy consumed by the EPAS motor of the vehicle is accordingly reduced (e.g., minimized) throughout the stall recovery process, which advantageously increases the amount of stored energy available to the starter of the vehicle.

The disclosed methods and apparatus may also advantageously ramp out current from, and/or ramp in current to, the EPAS motor accordingly to ramp out and/or ramp in rates that reduce (e.g., minimize) occurrences of voltage flair and/or steering wheel jerk in connection with the stall recovery process. As a result of the aforementioned advantages and/or benefits, the disclosed methods and apparatus for controlling an EPAS motor in response to detecting engine stall while restarting an auto stop-start engine reduce drivability, performance and/or quality issues associated with the vehicle, and improve the level of customer (e.g., driver) satisfaction associated with the experience of driving the vehicle.

As used herein in the context of providing and/or supplying current to an EPAS motor, the terms "ramp out" and "ramping out" refer to decreasing (e.g., linearly or non-linearly, uniformly or non-uniformly) the provided and/or supplied current from a higher value, level and/or state to a comparatively lower value, level and/or state. For example, current supplied and/or provided to the EPAS motor may be ramped out from a maximum supplied and/or provided level to a minimum supplied and/or provided level. Conversely, the terms "ramp in" and "ramping in" refer to increasing (e.g., linearly or non-linearly, uniformly or non-uniformly) the provided and/or supplied current from a lower value, level and/or state to a comparatively higher value, level and/or state. For example, current supplied and/or provided to the EPAS motor may be ramped in from a minimum supplied and/or provided level to a maximum supplied and/or provided level. In some examples, the minimum supplied and/or provided level of current may be zero amps.

FIG. 1 is a block diagram of an example vehicle 100 including an example auto stop-start engine system 102 constructed in accordance with the teachings of this disclosure. The vehicle 100 of FIG. 1 further includes an example EPAS system 104 and an example battery 106. The auto stop-start engine system 102 of FIG. 1 is operatively coupled to (e.g., in electrical communication with) the EPAS system 104 and the battery 106 of FIG. 1.

The auto stop-start engine system 102 of FIG. 1 includes an example auto stop-start engine 108, an example voltage detector 110, an example engine speed detector 112, an example engine state detector 114, an example engine controller 116 having an example stall recovery attempt counter 118 and an example stall recovery attempt timer 120, and an example engine memory 122. Respective ones of the auto stop-start engine 108, the voltage detector 110, the engine speed detector 112, the engine state detector 114, the engine controller 116, the stall recovery attempt counter 118, the stall recovery attempt timer 120, and the engine memory 122 of the auto stop-start engine system 102 are operatively coupled to one another via a network such as a controller area network ("CAN"). One or more of the auto stop-start engine 108, the voltage detector 110, the engine speed detector 112, the engine state detector 114, the engine controller 116, the stall recovery attempt counter 118, the stall recovery attempt timer 120, and the engine memory 122 of the auto stop-start engine system 102 may also be operatively coupled (e.g., via a network such as a CAN) to the EPAS system 104 and/or the battery 106 of the vehicle 100 of FIG. 1.

The EPAS system 104 of FIG. 1 includes an example EPAS controller 124, an example EPAS memory 126, and an example EPAS motor 128. Respective ones of the EPAS controller 124, the EPAS memory 126, and the EPAS motor 128 of the EPAS system 104 are operatively coupled to one another via a network such as a CAN. One or more of the EPAS controller 124, the EPAS memory 126, and the EPAS motor 128 of the EPAS system 104 may also be operatively coupled (e.g., via a network such as a CAN) to the auto stop-start engine system 102 and/or the battery 106 of the vehicle 100 of FIG. 1.

The battery 106 of FIG. 1 supplies electrical energy to the components of the vehicle 100 of FIG. 1. For example, the battery 106 may supply energy to the auto stop-start engine 108, the voltage detector 110, the engine speed detector 112, the engine state detector 114, the engine controller 116, the stall recovery attempt counter 118, the stall recovery attempt timer 120, and/or the engine memory 122 of the auto stop-start engine system 102 of FIG. 1. In such an example, the battery 106 may supply energy to the auto stop-start engine 108 of FIG. 1 to start, crank, and/or re-crank the auto stop-start engine 108 when the auto stop-start engine 108 is stopped and/or auto stopped. The battery 106 may also supply energy to the EPAS controller 124, the EPAS memory 126, and/or the EPAS motor 128 of the EPAS system 104 of FIG. 1. The battery 106 of FIG. 1 has an associated voltage. In some examples, the battery 106 of FIG. 1 may be implemented as a twelve-volt automotive battery.

The auto stop-start engine 108 of FIG. 1 is an internal combustion engine including and/or controlled by automated stop-start functionality. The automated stop-start functionality is configured to shut down and/or stop the internal combustion engine of the auto stop-start engine 108 when the internal combustion engine begins to idle. The automated stop-start functionality is further configured to re-crank and/or restart (e.g., auto start) the internal combustion engine of the auto stop-start engine 108 in response to an indication that the internal combustion engine is no longer intended to be stopped (e.g., as may be indicated by the release of the brake pedal of the vehicle 100 of FIG. 1).

The voltage detector 110 of FIG. 1 senses, measures and/or detects one or more voltage(s) (e.g., voltage data) of the battery 106 of FIG. 1. In some examples, the voltage detector 110 may sense, measure and/or detect that the voltage(s) of the battery 106 while the auto stop-start engine 108 of FIG. 1 is re-cranking and/or restarting (e.g., auto starting) subsequent to the auto stop-start engine 108 having been auto stopped.

Voltage data corresponding to the voltage(s) of the battery 106 of FIG. 1 sensed, measured and/or detected by the voltage detector 110 of FIG. 1 may be stored in the engine memory 122 of FIG. 1. In some examples, the voltage data may be accessed by the engine state detector 114 and/or the engine controller 116 of FIG. 1 from the engine memory 122 of FIG. 1. In other examples, the voltage data may be accessed by the engine state detector 114 and/or the engine controller 116 of FIG. 1 directly from the voltage detector 110 of FIG. 1. In some examples, the voltage detector 110 of FIG. 1 may constantly sense and/or constantly detect the voltage(s) (e.g., the voltage data) of the battery 106 of FIG. 1. In other examples, the voltage detector 110 of FIG. 1 may periodically sense and/or periodically detect the voltage(s) of the battery 106 of FIG. 1 based on a timing interval and/or a sampling frequency implemented via the engine state detector 114 and/or the engine controller 116 of FIG. 1.

While the voltage detector 110 is shown in the example of FIG. 1 as being integrated into the auto stop-start engine system 102 of FIG. 1, the voltage detector 110 may alternatively be located separately from the auto stop-start engine system 102 (e.g., at a remote location within the vehicle 100 of FIG. 1). For example, the voltage detector 110 may alternatively be located at and/or integrated into the battery 106 of FIG. 1. In examples where the voltage detector 110 is located remotely from the auto stop-start engine system 102, the voltage data sensed and/or detected by the voltage detector 110 may be transmitted to and/or otherwise made accessible to the engine state detector 114, the engine controller 116, and/or the engine memory 122 of the auto stop-start engine system 102 of FIG. 1 via a network such as a CAN.

The engine speed detector 112 of FIG. 1 senses, measures and/or detects one or more engine speed(s) (e.g., engine speed data) of the auto stop-start engine 108 of FIG. 1. In some examples, the engine speed detector 112 may sense, measure and/or detect that the engine speed(s) of the auto stop-start engine 108 while the auto stop-start engine 108 is re-cranking and/or restarting (e.g., auto starting) subsequent to the auto stop-start engine 108 having been auto stopped.

Engine speed data corresponding to the engine speed(s) of the auto stop-start engine 108 of FIG. 1 sensed, measured and/or detected by the engine speed detector 112 of FIG. 1 may be stored in the engine memory 122 of FIG. 1. In some examples, the engine speed data may be accessed by the engine state detector 114 and/or the engine controller 116 of FIG. 1 from the engine memory 122 of FIG. 1. In other examples, the engine speed data may be accessed by the engine state detector 114 and/or the engine controller 116 of FIG. 1 directly from the engine speed detector 112 of FIG. 1.

In some examples, the engine speed detector 112 of FIG. 1 may constantly sense and/or constantly detect the engine speed(s) (e.g., the engine speed data) of the auto stop-start engine 108 of FIG. 1. In other examples, the engine speed detector 112 of FIG. 1 may periodically sense and/or periodically detect the engine speed(s) of the auto stop-start engine 108 of FIG. 1 based on a timing interval and/or a sampling frequency implemented via the engine state detector 114 and/or the engine controller 116 of FIG. 1.

While the engine speed detector 112 is shown in the example of FIG. 1 as being integrated into the auto stop-start engine system 102 of FIG. 1, the engine speed detector 112 may alternatively be located separately from the auto stop-start engine system 102 (e.g., at a remote location within the vehicle 100 of FIG. 1). In examples where the engine speed detector 112 is located remotely from the auto stop-start engine system 102, the engine speed data sensed and/or detected by the engine speed detector 112 may be transmitted to and/or otherwise made accessible to the engine state detector 114, the engine controller 116, and/or the engine memory 122 of the auto stop-start engine system 102 of FIG. 1 via a network such as a CAN.

The engine state detector 114 of FIG. 1 senses and/or detects one or more operational state(s) (e.g., engine state data) of the auto stop-start engine 108 of FIG. 1. For example, the engine state detector 114 may sense and/or detect that the auto stop-start engine 108 is and/or has been auto stopped. As another example, the engine state detector 114 of FIG. 1 may additionally or alternatively sense and/or detect that the auto stop-start engine 108 of FIG. 1 is re-cranking and/or restarting (e.g., auto starting). In such some such examples, the engine state detector 114 may sense and/or detect that the auto stop-start engine 108 is re-cranking and/or restarting subsequent to the auto stop-start engine 108 having been auto stopped. In other such examples, the engine state detector 114 may sense and/or detect that the auto stop-start engine 108 is re-cranking and/or restarting in connection with a stall recovery attempt.

As another example, the engine state detector 114 of FIG. 1 may additionally or alternatively sense and/or detect that the auto stop-start engine 108 of FIG. 1 has successfully restarted. In some such examples, the engine state detector 114 may sense and/or detect that the auto stop-start engine 108 has successfully restarted in response to being re-cranked subsequent to the auto stop-start engine 108 having been auto stopped. In other such examples, the engine state detector 114 may sense and/or detect that the auto stop-start engine 108 has successfully restarted in response to being re-cranked in connection with a stall recovery attempt.

As another example, the engine state detector 114 of FIG. 1 may additionally or alternatively sense and/or detect that the auto stop-start engine 108 of FIG. 1 has stalled. In some such examples, the engine state detector 114 may sense and/or detect that the auto stop-start engine 108 has stalled in response to being re-cranked subsequent to the auto stop-start engine 108 having been auto stopped. In other such examples, the engine state detector 114 may sense and/or detect that the auto stop-start engine 108 has stalled in response to being re-cranked in connection with a stall recovery attempt.

In some examples, the engine state detector 114 of FIG. 1 may sense and/or detect that the auto stop-start engine 108 of FIG. 1 has been auto stopped, that the auto stop-start engine 108 is restarting and/or re-cranking (e.g., auto starting), that the auto stop-start engine 108 has been successfully restarted, and/or that the auto stop-start engine 108 has stalled based in part on the engine speed data sensed and/or detected by the engine speed detector 112 of FIG. 1, and/or based on the voltage data sensed and/or detected by the voltage detector 110 of FIG. 1. For example, a decrease in and/or zeroing of the engine speed data sensed and/or detected by the engine speed detector 112 of FIG. 1 in connection with an attempted re-crank and/or restart of the auto stop-start engine 108 of FIG. 1 may indicate to the engine state detector 114 of FIG. 1 that the attempted re-crank and/or restart of the auto stop-start engine 108 is unsuccessful and/or that the auto stop-start engine 108 has stalled, while an increase in the engine speed data (e.g., engine speed data rising above an engine speed threshold) may instead indicate to the engine state detector 114 of FIG. 1 that the attempted re-crank and/or restart of the auto stop-start engine 108 is successful. As another example, a zeroing of the voltage data sensed and/or detected by the voltage detector 110 of FIG. 1 in connection with an attempted re-crank and/or restart of the auto stop-start engine 108 of FIG. 1 may indicate to the engine state detector 114 of FIG. 1 that the attempted re-crank and/or restart of the auto stop-start engine 108 is unsuccessful and/or that the auto stop-start engine 108 has stalled, while an increase in the voltage data (e.g., voltage data rising above a voltage threshold) may instead indicate to the engine state detector 114 of FIG. 1 that the attempted re-crank and/or restart of the auto stop-start engine 108 is successful. Engine state data corresponding to the operational state(s) of the auto stop-start engine 108 of FIG. 1 sensed and/or detected by the engine state detector 114 of FIG. 1 may be stored in the engine memory 122 of FIG. 1. In some examples, the engine state data may be accessed by the engine controller 116 of FIG. 1 from the engine memory 122 of FIG. 1. In other examples, the engine state data may be accessed by the engine controller 116 of FIG. 1 directly from the engine state detector 114 of FIG. 1.

In some examples, the engine state detector 114 of FIG. 1 may constantly sense and/or constantly detect the operational state(s) (e.g., the engine state data) of the auto stop-start engine 108 of FIG. 1. In other examples, the engine state detector 114 of FIG. 1 may periodically sense and/or periodically detect the operational state(s) of the auto stop-start engine 108 of FIG. 1 based on a timing interval and/or a sampling frequency implemented via the engine controller 116 of FIG. 1.

While the engine state detector 114 is shown in the example of FIG. 1 as being integrated into the auto stop-start engine system 102 of FIG. 1, the engine state detector 114 may alternatively be located separately from the auto stop-start engine system 102 (e.g., at a remote location within the vehicle 100 of FIG. 1). In examples where the engine state detector 114 is located remotely from the auto stop-start engine system 102, the engine state data sensed and/or detected by the engine state detector 114 may be transmitted to and/or otherwise made accessible to the engine controller 116 and/or the engine memory 122 of the auto stop-start engine system 102 of FIG. 1 via a network such as a CAN.

The engine controller 116 of FIG. 1 may be implemented by a semiconductor device such as a processor, microprocessor, controller or microcontroller. In the illustrated example of FIG. 1, the engine controller 116 manages and/or controls the auto stop-start engine 108, the voltage detector 110, the engine speed detector 112, the engine state detector 114, the stall recovery attempt counter 118, the stall recovery attempt timer 120, and/or, more generally, the auto stop-start engine system 102 of FIG. 1. The engine controller 116 of FIG. 1 also controls and/or manages the EPAS controller 124, the EPAS motor 128, and/or, more generally, the EPAS system 104 of FIG. 1 based on data and/or information received, obtained and/or accessed by the engine controller 116 and/or the auto stop-start engine system 102 from one or more of the voltage detector 110, the engine speed detector 112, the engine state detector 114, the stall recovery attempt counter 118, and/or the stall recovery attempt timer 120 of FIG. 1.

The engine controller 116 of FIG. 1 determines whether the auto stop-start engine 108 of FIG. 1 is auto stopped based on engine state data sensed and/or detected by the engine state detector 114 of FIG. 1. In some examples, the engine state data may be based in part on the engine speed data sensed and/or detected by the engine speed detector 112 of FIG. 1, and/or the voltage data sensed and/or detected by the voltage detector 110 of FIG. 1. In response to determining that the auto stop-start engine 108 of FIG. 1 is auto stopped, the engine controller 116 of FIG. 1 further determines, based on engine state data sensed and/or detected by the engine state detector 114 of FIG. 1, whether the auto stop-start engine 108 is re-cranking and/or restarting (e.g., auto starting) subsequent to the auto stop-start engine 108 having been auto stopped.

In response to determining that the auto stop-start engine 108 is re-cranking and/or restarting subsequent to the auto stop-start engine 108 having been auto stopped, the engine controller 116 of FIG. 1 further determines, based on engine state data sensed and/or detected by the engine state detector 114 of FIG. 1, whether the auto stop-start engine 108 has been successfully re-cranked and/or restarted. In response to determining that the auto stop-start engine 108 of FIG. 1 has not been successfully re-cranked and/or restarted, the engine controller 116 of FIG. 1 further determines, based on engine state data sensed and/or detected by the engine state detector 114 of FIG. 1, whether the auto stop-start engine 108 has stalled. In response to determining that the auto stop-start engine 108 of FIG. 1 has stalled, the engine controller 116 of FIG. 1 generates one or more control signal(s) to ramp out current from the EPAS motor 128 of the EPAS system 104 of FIG. 1 according to a ramp out rate (e.g., ramp out rate data). In some examples, the engine controller 116 generates the control signal(s) to ramp out current from the EPAS motor 128 while the auto stop-start engine 108 of FIG. 1 is stalled. In some examples, the engine controller 116 of FIG. 1 transmits and/or otherwise communicates the generated control signal(s) to the EPAS controller 124 of the EPAS system 104 of FIG. 1, and the EPAS controller 124 controls, manages and/or otherwise facilitates the ramping out of current from the EPAS motor 128 based on the received control signal(s).

Ramp out rate data corresponding to the rate at which current is to be ramped out from the EPAS motor 128 of FIG. 1 may be stored in the engine memory 122 and/or the EPAS memory 126 of FIG. 1. The stored ramp out rate data may subsequently be accessed by the engine controller 116 from the engine memory 122 of FIG. 1, and/or by the EPAS controller 124 from the EPAS memory 126 of FIG. 1. In some examples, the ramp out rate is configurable and/or programmable to different values. For example, the engine controller 116, the engine memory 122, the EPAS controller 124, and/or the EPAS memory 126 of FIG. 1 may receive (e.g., via a network such as a CAN) data and/or information indicating a value for the ramp out rate to be implemented by the engine controller 116, the EPAS controller 124, and/or the EPAS motor 128 of FIG. 1 when ramping out current from the EPAS motor 128.

In some examples, the ramp out rate may be programmed and/or set to a value that reduces (e.g., limits and/or prevents) voltage flair of the battery 106 of FIG. 1 and/or steering wheel jerk associated with a steering assembly of the vehicle 100 of FIG. 1 in connection with ramping out current from the EPAS motor 128. For example, the ramp out rate may be programmed and/or set to a value less than or equal to thirty amps per second (≤30 A/s) for cars, or less than or equal to forty amps per second (≤40 A/s) for trucks. In some examples, the ramp out rate may be dependent on the state of charge of the battery 106 of FIG. 1 as determined, for example, based on the voltage sensed and/or detected by the voltage detector 110 of FIG. 1. For example, a relatively low ramp out rate (e.g., less than or equal to ten amps per second (≤10 A/s) may be implemented in response to determining that the battery 106 of FIG. 1 is carrying a corresponding relatively low charge (e.g., a charge of ten volts for a twelve-volt battery).

In response to generating one or more control signal(s) to ramp out current from the EPAS motor 128 of FIG. 1, the engine controller 116 of FIG. 1 determines whether the ramp out of current from the EPAS motor 128 is complete. In some examples, the engine controller 116 may determine that the ramp out of current from the EPAS motor 128 is complete based on one or more signal(s) received by the engine controller 116 from the EPAS controller 124 and/or, more generally, the EPAS system 104 of FIG. 1.

In response to determining that the ramp out of current from the EPAS motor 128 of FIG. 1 is complete, the engine controller 116 of FIG. 1 initiates and/or invokes a stall recovery process. In some examples in connection with initiating and/or invoking the stall recovery process, the engine controller 116 of FIG. 1 may instruct (e.g., via one or more control signal(s)) the auto stop-start engine 108 of FIG. 1 to perform a stall recovery attempt (e.g., an attempt to re-crank and/or restart the auto stop-start engine 108 in response to the auto stop-start engine having stalled). In some examples in connection with initiating and/or invoking the stall recovery process, the engine controller 116 of FIG. 1 may also instruct (e.g., via one or more control signal(s)) the stall recovery attempt counter 118 of FIG. 1 to increase in count value (e.g., from an attempt count of zero to an attempt count of one). In some examples in connection with initiating and/or invoking the stall recovery process, the engine controller 116 of FIG. 1 may also instruct (e.g., via one or more control signal(s)) the stall recovery attempt timer 120 of FIG. 1 to run and/or commence (e.g., to begin tracking elapsed time from a start time of zero seconds).

In response to initiating and/or invoking the stall recovery process, the engine controller 116 of FIG. 1 determines, based on engine state data sensed and/or detected by the engine state detector 114 of FIG. 1, whether the auto stop-start engine 108 of FIG. 1 has been successfully re-cranked and/or restarted in connection with the stall recovery attempt. In response to determining that the auto stop-start engine 108 of FIG. 1 has not been successfully re-cranked and/or restarted in connection with the stall recovery attempt, the engine controller 116 of FIG. 1 further determines, based on engine state data sensed and/or detected by the engine state detector 114 of FIG. 1, whether the auto stop-start engine 108 has stalled in connection with the stall recovery attempt.

In response to determining that the auto stop-start engine 108 of FIG. 1 has stalled in connection with the stall recovery attempt, the engine controller 116 of FIG. 1 determines whether the stall recovery attempt timer 120 of FIG. 1 has expired. For example, the engine controller 116 may determine whether an elapsed time (e.g., elapsed time data) calculated, maintained, and/or otherwise determined by the stall recovery attempt timer 120 is greater than or equal to an elapsed time threshold (e.g., elapsed time threshold data) associated with the stall recovery attempt. Elapsed time threshold data corresponding to the elapsed time threshold associated with the stall recovery attempt may be stored in the engine memory 122 of FIG. 1. The stored elapsed time threshold data may subsequently be accessed by the engine controller 116 from the engine memory 122 of FIG. 1. In some examples, the elapsed time threshold is configurable and/or programmable to different values. For example, the engine controller 116 and/or the engine memory 122 of FIG. 1 may receive (e.g., via a network such as a CAN) data and/or information indicating a value for the elapsed time threshold to be implemented by the engine controller 116 of FIG. 1 when determining whether the stall recovery attempt timer 120 of FIG. 1 has expired. In some examples, the elapsed time threshold may be programmed and/or set to a value of five seconds.

In response to determining that the stall recovery attempt timer 120 of FIG. 1 has expired, the engine controller 116 of FIG. 1 determines, via the stall recovery attempt counter 118 of FIG. 1, whether another stall recovery attempt is to be made. For example, the engine controller 116 may determine whether an attempt count (e.g., attempt count data) calculated, maintained, and/or otherwise determined by the stall recovery attempt counter 118 is greater than or equal to an attempt count threshold (e.g., attempt count threshold data) associated with the maximum number of unsuccessful stall recovery attempts to be made in response to the auto stop-start engine 108 of FIG. 1 having stalled. Attempt count threshold data corresponding to the maximum number of successive unsuccessful stall recovery attempts to be made may be stored in the engine memory 122 of FIG. 1. The stored attempt count threshold data may subsequently be accessed by the engine controller 116 from the engine memory 122 of FIG. 1. In some examples, the attempt count threshold is configurable and/or programmable to different values. For example, the engine controller 116 and/or the engine memory 122 of FIG. 1 may receive (e.g., via a network such as a CAN) data and/or information indicating a value for the attempt count threshold to be implemented by the engine controller 116 of FIG. 1 when determining whether another stall recovery attempt is to be made. In some examples, the attempt count threshold may be programmed and/or set to a value of ten consecutive failed attempts (e.g., ten successive unsuccessful stall recovery attempts).

In response to determining that another stall recovery attempt is to be made, the engine controller 116 of FIG. 1 resets the stall recovery attempt timer 120 of FIG. 1 (e.g., resets the elapsed time to a value of zero seconds) and repeats the above-described instructions associated with initiating and/or invoking the stall recovery process. The engine controller 116 may accordingly instruct the auto stop-start engine 108 of FIG. 1 to perform another stall recovery attempt, instruct the stall recovery attempt counter 118 of FIG. 1 to increase in count value (e.g., from an attempt count of one to an attempt count of two), and instruct the stall recovery attempt timer 120 of FIG. 1 to run and/or commence (e.g., to again begin tracking elapsed time from a start time of zero seconds). The iterative process of successive stall recovery attempts may continue until the engine controller 116 of FIG. 1 either determines that the attempt count associated with the stall recovery attempt counter 118 of FIG. 1 has exceeded the attempt count threshold, or that the auto stop-start engine 108 of FIG. 1 has been successfully re-cranked and/or restarted in connection with the stall recovery attempt, whichever occurs first.

In response to determining that the auto stop-start engine 108 has successfully re-cranked and/or restarted in connection with the stall recovery attempt, the engine controller 116 of FIG. 1 resets the stall recovery attempt counter 118 of FIG. 1 (e.g., resets the attempt count to zero), and generates one or more control signal(s) to ramp in current to the EPAS motor 128 of the EPAS system 104 of FIG. 1 according to a ramp in rate (e.g., ramp in rate data). In some examples, the engine controller 116 generates the control signal(s) to ramp in current to the EPAS motor 128 subsequent to the auto stop-start engine 108 of FIG. 1 successfully re-cranking and/or restarting. In some examples, the engine controller 116 of FIG. 1 transmits the generated control signal(s) to the EPAS controller 124 of the EPAS system 104 of FIG. 1, and the EPAS controller 124 controls, manages and/or otherwise facilitates the ramping in of current to the EPAS motor 128 based on the received control signal(s).

Ramp in rate data corresponding to the rate at which current is to be ramped in to the EPAS motor 128 of FIG. 1 may be stored in the engine memory 122 and/or the EPAS memory 126 of FIG. 1. The stored ramp in rate data may subsequently be accessed by the engine controller 116 from the engine memory 122 of FIG. 1, and/or by the EPAS controller 124 from the EPAS memory 126 of FIG. 1. In some examples, the ramp in rate is configurable and/or programmable to different values. For example, the engine controller 116, the engine memory 122, the EPAS controller 124, and/or the EPAS memory 126 of FIG. 1 may receive (e.g., via a network such as a CAN) data and/or information indicating a value for the ramp in rate to be implemented by the engine controller 116, the EPAS controller 124, and/or the EPAS motor 128 of FIG. 1 when ramping in current to the EPAS motor 128.

In some examples, the ramp in rate may be programmed and/or set to a value that reduces (e.g., limits and/or prevents) voltage flair of the battery 106 of FIG. 1 and/or steering wheel jerk associated with a steering assembly of the vehicle 100 of FIG. 1 in connection with ramping in current to the EPAS motor 128. For example, the ramp in rate may be programmed and/or set to a value less than or equal to thirty amps per second ($\leq 30$ A/s) for cars, or less than or equal to forty amps per second ($\leq 40$ A/s) for trucks. In some examples, the ramp in rate may be dependent on the state of charge of the battery 106 of FIG. 1 as determined, for example, based on the voltage sensed and/or detected by the voltage detector 110 of FIG. 1. For example, a relatively low ramp in rate (e.g., less than or equal to ten amps per second ($\leq 10$ A/s) may be implemented in response to determining that the battery 106 of FIG. 1 is carrying a corresponding relatively low charge (e.g., a charge of ten volts for a twelve-volt battery).

The engine memory 122 of FIG. 1 may be implemented by any type(s) and/or any number(s) of storage device(s) such as a storage drive, a flash memory, a read-only memory (ROM), a random-access memory (RAM), a cache and/or any other storage medium in which information is stored for any duration (e.g., for extended time periods, permanently, brief instances, for temporarily buffering, and/or for caching of the information). The information stored in the engine memory 122 may be stored in any file and/or data structure format, organization scheme, and/or arrangement.

Data and/or information received by the engine state detector 114, the engine controller 116, and/or, more generally, by the auto stop-start engine system 102 of FIG. 1 from any of the voltage detector 110, the engine speed detector 112, the engine state detector 114, the stall recovery attempt counter 118, and/or the stall recovery attempt timer 120 of FIG. 1 may be stored in the engine memory 122 of FIG. 1. Data and/or information corresponding to any of the above-described voltage data, engine speed data, engine state data, ramp out rate data, elapsed time data, elapsed time threshold data, attempt count data, attempt count threshold data, and/or ramp in rate data may also be stored in the engine memory 122. Data and/or information stored in the engine memory 122 is accessible to the engine state detector 114, the engine controller 116, the stall recovery attempt counter 118, the stall recovery attempt timer 120, and/or, more generally, the auto stop-start engine system 102 of FIG. 1.

The EPAS controller 124 of FIG. 1 controls and/or manages the operation of the EPAS motor 128 of FIG. 1 based on control signals received by the EPAS controller 124 from the engine controller 116, and/or, more generally, from the auto stop-start engine system 102 of FIG. 1. For example, the EPAS controller 124 of FIG. 1 may ramp out current from the EPAS motor 128 of FIG. 1 according to a specified and/or indicated ramp out rate in response to one or more control signal(s) received from the engine controller 116 of FIG. 1. In some such examples, the EPAS controller 124 of FIG. 1 may determine the ramp out rate based on ramp out rate data stored in the EPAS memory 126 of FIG. 1. As another example, the EPAS controller 124 of FIG. 1 may ramp in current to the EPAS motor 128 of FIG. 1 according to a specified and/or indicated ramp in rate in response to one or more control signal(s) received from the engine controller 116 of FIG. 1. In some such examples, the EPAS controller 124 of FIG. 1 may determine the ramp in rate based on ramp in rate data stored in the EPAS memory 126 of FIG. 1.

The EPAS memory 126 of FIG. 1 may be implemented by any type(s) and/or any number(s) of storage device(s) such as a storage drive, a flash memory, a read-only memory (ROM), a random-access memory (RAM), a cache and/or any other storage medium in which information is stored for any duration (e.g., for extended time periods, permanently, brief instances, for temporarily buffering, and/or for caching of the information). The information stored in the EPAS memory 126 may be stored in any file and/or data structure format, organization scheme, and/or arrangement.

Data and/or information received by the EPAS controller 124, the EPAS motor 128, and/or, more generally, by the EPAS system 104 of FIG. 1 from the engine controller 116 and/or, more generally, the auto stop-start engine system 102 of FIG. 1 may be stored in the EPAS memory 126 of FIG. 1. Data and/or information corresponding to any of the above-described ramp out rate data and/or ramp in rate data may also be stored in the EPAS memory 126. Data and/or information stored in the EPAS memory 126 is accessible to the EPAS controller 124, the EPAS motor 128, and/or, more generally, the EPAS system 104 of FIG. 1.

The EPAS motor 128 of FIG. 1 provides powered assistance (e.g., power-assisted torque and/or power-assisted momentum) to a steering assembly of the vehicle 100 of FIG. 1 to increase the ease with which a portion of the steering assembly (e.g., a steering wheel) may be rotated and/or otherwise moved by an occupant (e.g., a driver) of the vehicle 100 of FIG. 1. The degree and/or extent to which the EPAS motor 128 of FIG. 1 provides such powered assistance to the steering assembly decreases as current to the EPAS motor 128 is ramped out, and increases as current to the EPAS motor 128 is ramped in. The EPAS controller 124 of FIG. 1 may control and/or manage the ramping out of current from and/or the ramping in of current to the EPAS motor 128 of FIG. 1 based on the above-described control signal(s) generated by the engine controller 116 of FIG. 1 which are transmitted and/or otherwise communicated from the engine controller 116 to the EPAS controller 124.

While an example manner of implementing the auto stop-start engine system 102 is illustrated in FIG. 1, one or more of the elements, processes and/or devices illustrated in FIG. 1 may be combined, divided, re-arranged, omitted, eliminated and/or implemented in any other way. Further, the example auto stop-start engine 108, the example voltage detector 110, the example engine speed detector 112, the example engine state detector 114, the example engine controller 116, the example stall recovery attempt counter 118, the example stall recovery attempt timer 120, the example engine memory 122 and/or, more generally, the example auto stop-start engine system 102 of FIG. 1 may be implemented by hardware, software, firmware and/or any combination of hardware, software and/or firmware. Thus, for example, any of the example auto stop-start engine 108, the example voltage detector 110, the example engine speed detector 112, the example engine state detector 114, the example engine controller 116, the example stall recovery attempt counter 118, the example stall recovery attempt timer 120, the example engine memory 122 and/or, more generally, the example auto stop-start engine system 102 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example auto stop-start engine 108, the example voltage detector 110, the example engine speed detector 112, the example engine state detector 114, the example engine controller 116, the example stall recovery attempt counter 118, the example stall recovery attempt timer 120, the example engine memory 122 and/or, more generally, the example auto stop-start engine system 102 of FIG. 1 is/are hereby expressly defined to include a non-transitory computer readable storage device or storage disk such as a memory, a digital versatile disk (DVD), a compact disk (CD), a Blu-ray disk, etc. including the software and/or firmware. Further still, the example auto stop-start engine system 102 of FIG. 1 may include one or more elements, processes and/or devices in addition to, or instead of, those illustrated in FIG. 1, and/or may include more than one of any or all of the illustrated elements, processes and devices.

While an example manner of implementing the EPAS system 104 is illustrated in FIG. 1, one or more of the elements, processes and/or devices illustrated in FIG. 1 may be combined, divided, re-arranged, omitted, eliminated and/or implemented in any other way. Further, the example EPAS controller 124, the example EPAS memory 126, the example EPAS motor 128 and/or, more generally, the example EPAS system 104 of FIG. 1 may be implemented by hardware, software, firmware and/or any combination of hardware, software and/or firmware. Thus, for example, any of the example EPAS controller 124, the example EPAS memory 126, the example EPAS motor 128 and/or, more generally, the example EPAS system 104 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example EPAS controller 124, the example EPAS memory 126, the example EPAS motor 128 and/or, more generally, the example EPAS system 104 of FIG. 1 is/are hereby expressly defined to include a non-transitory computer readable storage device or storage disk such as a memory, a digital versatile disk (DVD), a compact disk (CD), a Blu-ray disk, etc. including the software and/or firmware. Further still, the example EPAS system 104 of FIG. 1 may include one or more elements, processes and/or devices in addition to, or instead of, those illustrated in FIG. 1, and/or may include more than one of any or all of the illustrated elements, processes and devices.

Figure 2A:
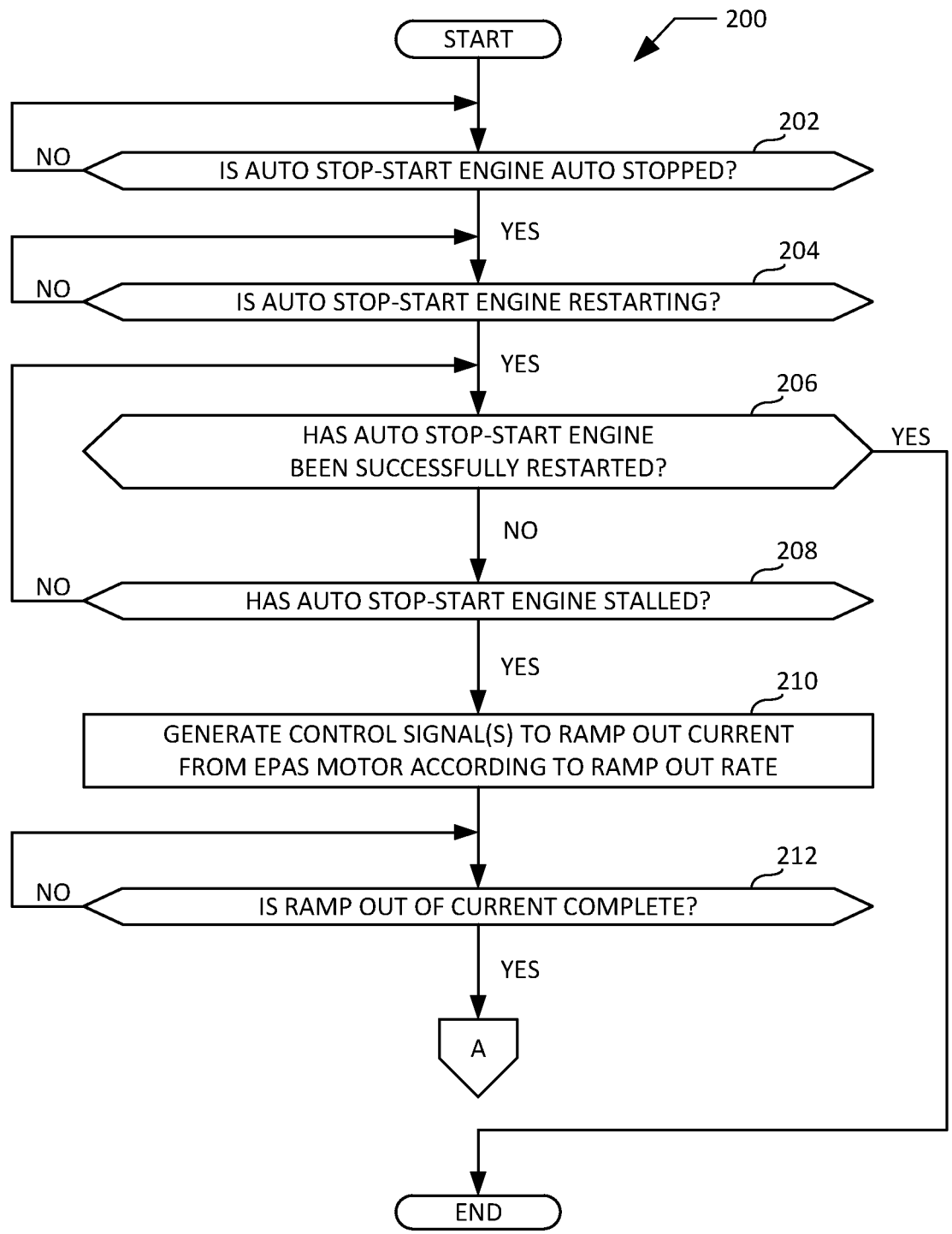
FIGS. 2A and 2B are a flowchart representative of an example method that may be executed at the example engine controller of the example auto stop-start engine system of FIG. 1 to control the example EPAS motor of the example EPAS system of FIG. 1 in response to detecting engine stall while restarting the example auto stop-start engine of FIG. 1.
Figure 2B:
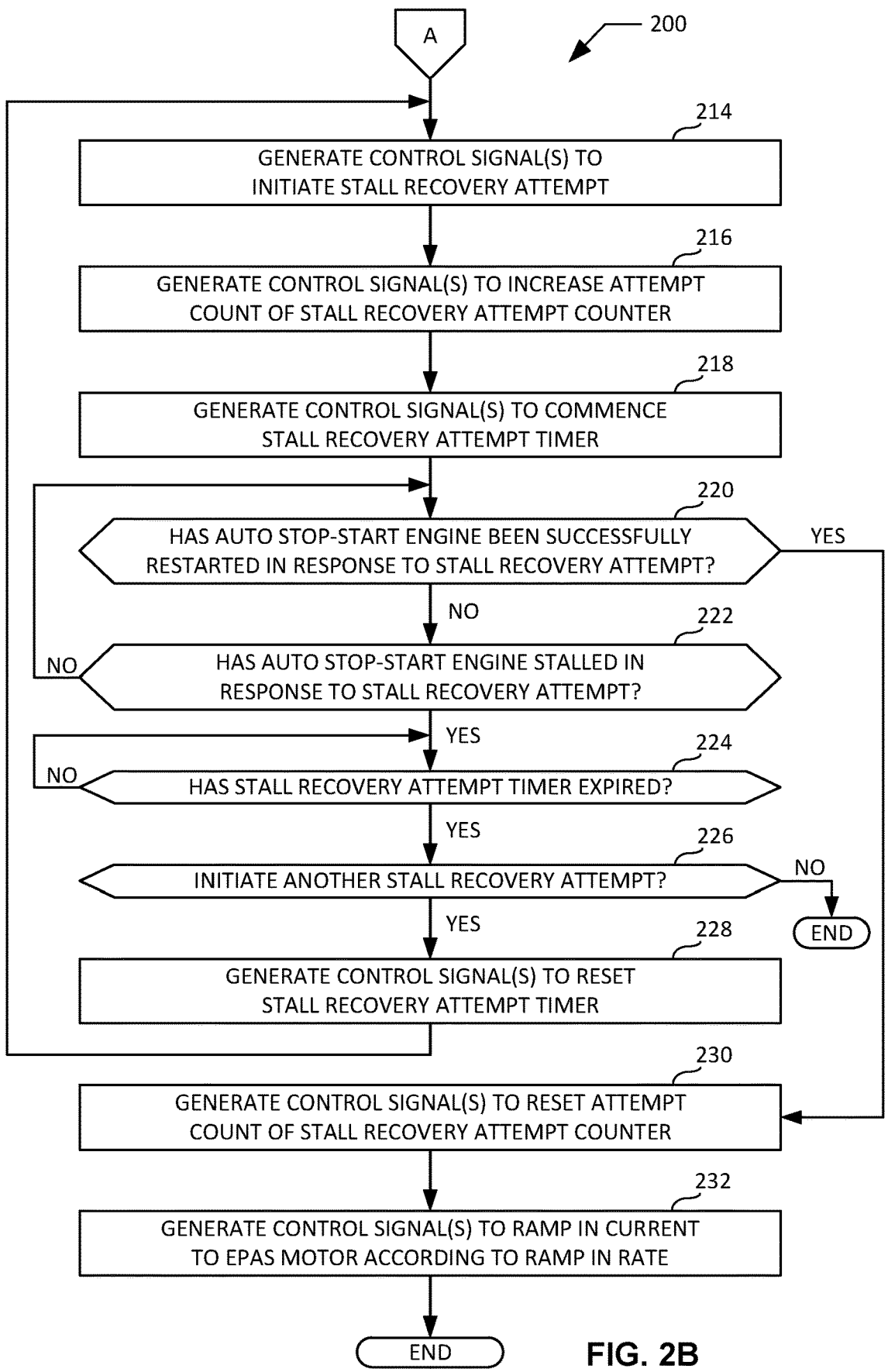

A flowchart representative of an example method for implementing the example engine controller 116 of the example auto stop-start engine system 102 of FIG. 1 to control the example EPAS motor 128 of the example EPAS system 104 of FIG. 1 in response to detecting engine stall while restarting the example auto stop-start engine 108 of FIG. 1 is shown in FIGS. 2A and 2B. In this example, the method may be implemented using machine-readable instructions that comprise one or more program(s) for execution by one or more processor(s) such as the processor 302 shown in the example processor platform 300 discussed below in connection with FIG. 3. The one or more program(s) may be embodied in software stored on a non-transitory computer readable storage medium such as a CD-ROM, a floppy disk, a hard drive, a digital versatile disk (DVD), a Blu-ray disk, or a memory associated with the processor 302, but the entirety of any program and/or parts thereof could alternatively be executed by a device other than the processor 302, and/or embodied in firmware or dedicated hardware. Further, although the example program(s) is/are described with reference to the flowchart illustrated in FIGS. 2A and 2B, many other methods of implementing the example auto stop-start engine system 102 of FIG. 1 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example method of FIGS. 2A and 2B may be implemented using coded instructions (e.g., computer and/or machine-readable instructions) stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

FIGS. 2A and 2B are a flowchart representative of an example method 200 that may be executed at the example engine controller 116 of the example auto stop-start engine system 102 of FIG. 1 to control the example EPAS motor 128 of the example EPAS system 104 of FIG. 1 in response to detecting engine stall while restarting the example auto stop-start engine 108 of FIG. 1. The example method 200 of FIGS. 2A and 2B begins when the engine controller 116 of FIG. 1 determines whether the auto stop-start engine 108 of FIG. 1 is auto stopped (block 202). For example, the engine controller 116 may determine that the auto stop-start engine 108 is auto stopped based on engine state data sensed and/or detected by the engine state detector 114 of FIG. 1. If the engine controller 116 determines at block 202 that the auto stop-start engine 108 is auto stopped, control of the example method 200 of FIGS. 2A and 2B proceeds to block 204. If the engine controller 116 instead determines at block 202 that the auto stop-start engine 108 is not auto stopped, control of the example method 200 of FIGS. 2A and 2B remains at block 202.

At block 204, the engine controller 116 of FIG. 1 determines whether the auto stop-start engine 108 of FIG. 1 is re-cranking and/or restarting (block 204). For example, the engine controller 116 may determine, based on engine state data sensed and/or detected by the engine state detector 114 of FIG. 1, that the auto stop-start engine 108 is re-cranking and/or restarting subsequent to the auto stop-start engine 108 having been auto stopped. If the engine controller 116 determines at block 204 that the auto stop-start engine 108 is re-cranking and/or restarting, control of the example method 200 of FIGS. 2A and 2B proceeds to block 206. If the engine controller 116 instead determines at block 204 that the auto stop-start engine 108 is not re-cranking and/or restarting, control of the example method 200 of FIGS. 2A and 2B remains at block 204.

At block 206, the engine controller 116 of FIG. 1 determines whether the auto stop-start engine 108 has been successfully re-cranked and/or restarted (block 206). For example, the engine controller 116 may determine, based on engine state data sensed and/or detected by the engine state detector 114 of FIG. 1, that the auto stop-start engine 108 has been successfully re-cranked and/or restarted. If the engine controller 116 determines at block 206 that the auto stop-start engine 108 has been successfully re-cranked and/or restarted, the example method 200 of FIGS. 2A and 2B ends. If the engine controller 116 instead determines at block 206 that the auto stop-start engine 108 has not been successfully re-cranked and/or restarted, control of the example method 200 of FIGS. 2A and 2B proceeds to block 208.

At block 208, the engine controller 116 of FIG. 1 determines whether the auto stop-start engine 108 has stalled (block 208). For example, the engine controller 116 may determine, based on engine state data sensed and/or detected by the engine state detector 114 of FIG. 1, that the auto stop-start engine 108 has stalled. If the engine controller 116 determines at block 208 that the auto stop-start engine 108 has stalled, control of the example method 200 of FIGS. 2A and 2B proceeds to block 210. If the engine controller 116 instead determines at block 208 that the auto stop-start engine 108 has not stalled, control of the example method 200 of FIGS. 2A and 2B returns to block 206.

At block 210, the engine controller 116 of FIG. 1 generates one or more control signal(s) to ramp out current from the EPAS motor 128 of FIG. 1 according to a ramp out rate (block 210). In response to the engine controller 116 generating the control signal(s) at block 210, the degree and/or extent to which the EPAS motor 128 of FIG. 1 provides powered assistance to a steering assembly of a vehicle (e.g., the vehicle 100 of FIG. 1) implementing the EPAS system 104 of FIG. 1 decreases as current from the EPAS motor 128 is ramped out according to the ramp out rate. Following block 210, control of the example method 200 of FIGS. 2A and 2B proceeds to block 212.

At block 212, the engine controller 116 of FIG. 1 determines whether the ramp out of current from the EPAS motor 128 of FIG. 1 is complete (block 212). For example, the engine controller 116 may determine, based on one or more signal(s) received from the EPAS controller 124 and/or, more generally, the EPAS system 104 of FIG. 1 that the ramp out of current from the EPAS motor 128 is complete. If the engine controller 116 determines at block 212 that ramp out of current from the EPAS motor 128 is complete, control of the example method 200 of FIGS. 2A and 2B proceeds to block 214. If the engine controller 116 instead determines at block 212 that the ramp out of current from the EPAS motor 128 is not complete, control of the example method 200 of FIGS. 2A and 2B remains at block 212.

At block 214, the engine controller 116 of FIG. 1 generates one or more control signal(s) instructing the auto stop-start engine 108 of FIG. 1 to initiate, make and/or perform a stall recovery attempt (block 214). For example, the engine controller 116 may generate one or more control signal(s) instructing the auto stop-start engine 108 to initiate, make and/or perform an attempt to re-crank and/or restart the auto stop-start engine 108 in response to the auto stop-start engine having stalled. Following block 214, control of the example method 200 of FIGS. 2A and 2B proceeds to block 216.

At block 216, the engine controller 116 of FIG. 1 generates one or more control signal(s) instructing the stall recovery attempt counter 118 of FIG. 1 to increase in count value (block 216). For example, the engine controller 116 may generate one or more control signal(s) instructing the stall recovery attempt counter 118 to increase from an attempt count of zero (e.g., attempt count=0) to an attempt count of one (e.g., attempt count=1). Following block 216, control of the example method 200 of FIGS. 2A and 2B proceeds to block 218.

At block 218, the engine controller 116 of FIG. 1 generates one or more control signal(s) instructing the stall recovery attempt timer 120 of FIG. 1 to run and/or commence (block 218). For example, the engine controller 116 may generate one or more control signal(s) instructing the stall recovery attempt timer 120 to begin tracking elapsed time from a start time of zero seconds. Following block 218, control of the example method 200 of FIGS. 2A and 2B proceeds to block 220.

At block 220, the engine controller 116 of FIG. 1 determines whether the auto stop-start engine 108 has been successfully re-cranked and/or restarted in response to the stall recovery attempt (block 220). For example, the engine controller 116 may determine, based on engine state data sensed and/or detected by the engine state detector 114 of FIG. 1, that the auto stop-start engine 108 has been successfully re-cranked and/or restarted in response to the stall recovery attempt. If the engine controller 116 determines at block 220 that the auto stop-start engine 108 has been successfully re-cranked and/or restarted in response to the stall recovery attempt, control of the example method 200 of FIGS. 2A and 2B proceeds to block 230. If the engine controller 116 instead determines at block 220 that the auto stop-start engine 108 has not been successfully re-cranked and/or restarted in response to the stall recovery attempt, control of the example method 200 of FIGS. 2A and 2B proceeds to block 222.

At block 222, the engine controller 116 of FIG. 1 determines whether the auto stop-start engine 108 has stalled in response to the stall recovery attempt (block 222). For example, the engine controller 116 may determine, based on engine state data sensed and/or detected by the engine state detector 114 of FIG. 1, that the auto stop-start engine 108 has stalled in response to the stall recovery attempt. If the engine controller 116 determines at block 222 that the auto stop-start engine 108 has stalled in response to the stall recovery attempt, control of the example method 200 of FIGS. 2A and 2B proceeds to block 224. If the engine controller 116 instead determines at block 222 that the auto stop-start engine 108 has not stalled in response to the stall recovery attempt, control of the example method 200 of FIGS. 2A and 2B returns to block 220.

At block 224, the engine controller 116 of FIG. 1 determines whether the stall recovery attempt timer 120 of FIG. 1 has expired (block 224). For example, the engine controller 116 may determine whether an elapsed time (e.g., elapsed time data) calculated, maintained, and/or otherwise determined by the stall recovery attempt timer 120 is greater than or equal to an elapsed time threshold (e.g., elapsed time threshold data) associated with the stall recovery attempt. If the engine controller 116 determines at block 224 that the stall recovery attempt timer 120 has expired, control of the example method 200 of FIGS. 2A and 2B proceeds to block 226. If the engine controller 116 instead determines at block 224 that the stall recovery attempt timer 120 has not expired, control of the example method 200 of FIGS. 2A and 2B remains at block 224.

At block 226, the engine controller 116 of FIG. 1 determines, via the stall recovery attempt counter 118 of FIG. 1, whether another stall recovery attempt is to be initiated, made and/or performed (block 226). For example, the engine controller 116 may determine whether an attempt count (e.g., attempt count data) calculated, maintained, and/or otherwise determined by the stall recovery attempt counter 118 is greater than or equal to an attempt count threshold (e.g., attempt count threshold data) associated with the maximum number of unsuccessful stall recovery attempts to be initiated, made and/or performed in response to the auto stop-start engine 108 of FIG. 1 having stalled. If the engine controller 116 determines at block 226 that another stall recovery attempt is to be initiated, made and/or performed, control of the example method 200 of FIGS. 2A and 2B proceeds to block 228. If the engine controller 116 instead determines at block 226 that another stall recovery attempt is not to be initiated, made and/or performed, the example method 200 of FIGS. 2A and 2B ends.

At block 228, the engine controller 116 of FIG. 1 generates one or more control signal(s) instructing the stall recovery attempt timer 120 of FIG. 1 to reset (block 228). For example, the engine controller 116 may generate one or more control signal(s) instructing the stall recovery attempt timer 120 to return and/or reset the elapsed time to a value of zero seconds. Following block 228, control of the example method 200 of FIGS. 2A and 2B returns to block 214.

At block 230, the engine controller 116 of FIG. 1 generates one or more control signal(s) instructing the stall recovery attempt counter 118 of FIG. 1 to reset (block 230). For example, the engine controller 116 may generate one or more control signal(s) instructing the stall recovery attempt counter 118 to return and/or reset the attempt count to zero. Following block 230, control of the example method 200 of FIGS. 2A and 2B proceeds to block 232.

At block 232, the engine controller 116 of FIG. 1 generates one or more control signal(s) to ramp in current to the EPAS motor 128 of FIG. 1 according to a ramp in rate (block 232). In response to the engine controller 116 generating the control signal(s) at block 232, the degree and/or extent to which the EPAS motor 128 of FIG. 1 provides powered assistance to a steering assembly of a vehicle (e.g., the vehicle 100 of FIG. 1) implementing the EPAS system 104 of FIG. 1 increases as current to the EPAS motor 128 is ramped in according to the ramp in rate. Following block 232, the example method 200 of FIGS. 2A and 2B ends.

Figure 3:
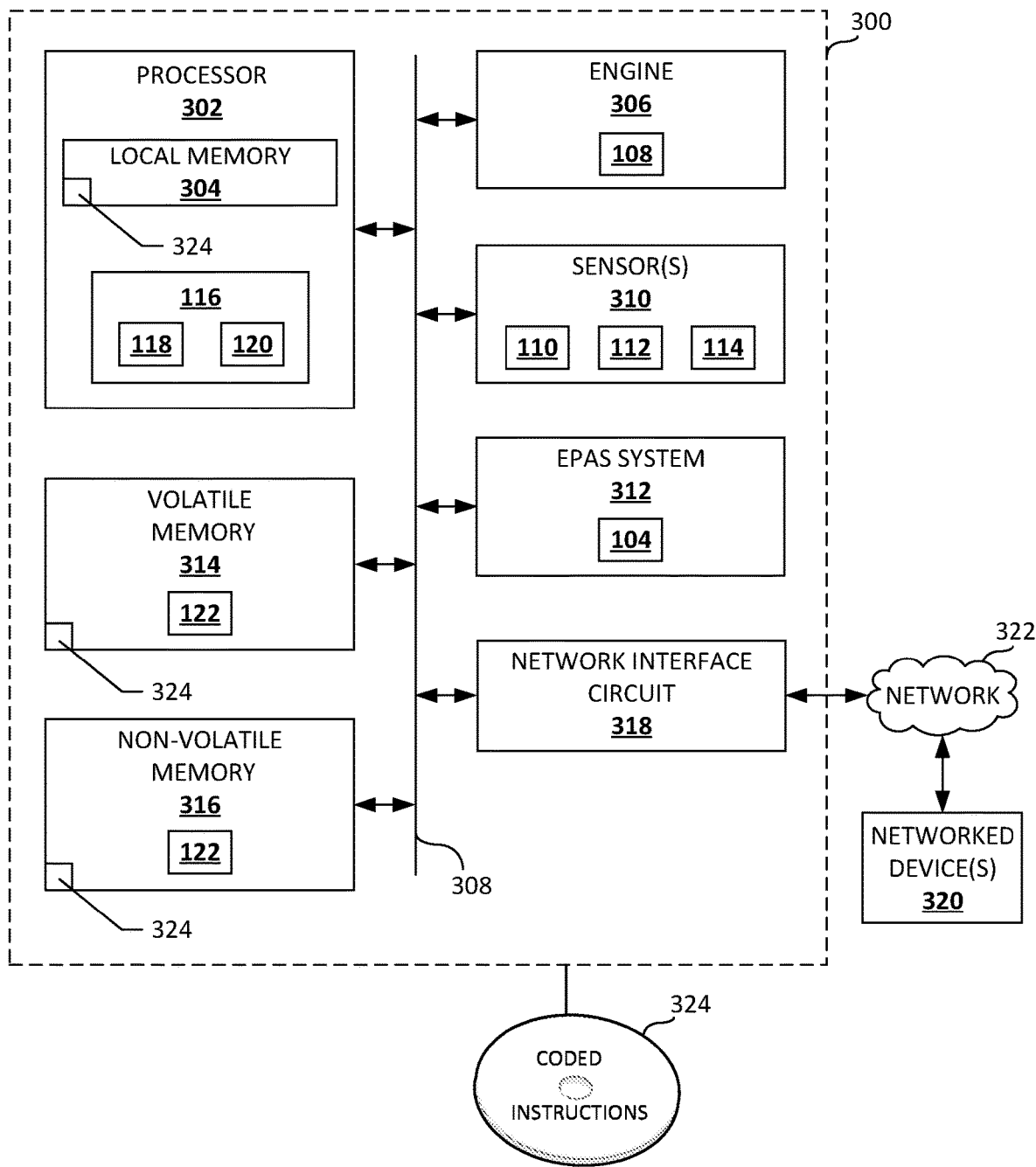
FIG. 3 is an example processor platform capable of executing instructions to implement the example method of FIGS. 2A and 2B, and the example auto stop-start engine system of FIG. 1.

FIG. 3 is a block diagram of an example processor platform 300 capable of executing instructions to implement the example method 200 of FIGS. 2A and 2B, and the example auto stop-start engine system 102 of FIG. 1. The processor platform 300 of the illustrated example includes a processor 302. The processor 302 of the illustrated example is hardware. For example, the processor 302 can be implemented by one or more integrated circuit(s), logic circuit(s), microprocessor(s) or controller(s) from any desired family or manufacturer. In the example of FIG. 3, the processor 302 implements the example engine controller 116, the example stall recovery attempt counter 118, and the example stall recovery attempt timer 120 of FIG. 1. The processor 302 of the illustrated example also includes a local memory 304 (e.g., a cache).

The processor 302 of the illustrated example is in communication with an engine 306 via a bus 308 (e.g., a CAN bus). In the example of FIG. 3, the engine 306 is implemented via the example auto stop-start engine 108 of FIG. 1. The processor 302 of the illustrated example is also in communication with one or more sensor(s) 310 via the bus 308. In the example of FIG. 3, the sensor(s) 310 include the example voltage detector 110, the example engine speed detector 112, and the example engine state detector 114 of FIG. 1. The processor 302 of the illustrated example is also in communication with an EPAS system 312 via the bus 308. In the example of FIG. 3, the EPAS system 312 is implemented via the example EPAS system 104 of FIG. 1.

The processor 302 of the illustrated example is also in communication with a main memory including a volatile memory 314 and a non-volatile memory 316 via the bus 308. The volatile memory 314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 316 may be implemented by flash memory and/or any other desired type of memory device. Access to the volatile memory 314 and the non-volatile memory 316 is controlled by a memory controller. In the illustrated example, the main memory 314, 316 includes the example engine memory 122 of FIG. 1.

The processor platform 300 of the illustrated example also includes a network interface circuit 318. The network interface circuit 318 may be implemented by any type of interface standard, such as an Ethernet interface, a universal serial bus (USB), and/or a PCI express interface. The network interface circuit 318 of the illustrated example includes a communication device such as a transmitter, a receiver, a transceiver, a modem and/or network interface card to facilitate exchange of data with one or more networked device(s) 320 (e.g., computing devices of any kind) via a network 322 (e.g., a controller area network, a wireless network, a cellular network, etc.).

Coded instructions 324 for implementing the example method 200 of FIGS. 2A and 2B may be stored in the local memory 304, in the volatile memory 314, in the non-volatile memory 316, and/or on a removable tangible computer readable storage medium such as a CD or DVD.

From the foregoing, it will be appreciated that the disclosed methods and apparatus for controlling an EPAS motor in response to detecting engine stall while restarting an auto stop-start engine advantageously increase (e.g., maximize) the stored energy available to be consumed in connection with restarting the stalled auto stop-start engine, while also reducing (e.g., limiting and/or preventing) occurrences of voltage flair and/or steering wheel jerk in connection with the restart. For example, the disclosed methods and apparatus ramp out current from the EPAS motor in response to detecting that the auto stop-start engine has stalled, invoke the stall recovery attempt in response to the ramp out of current (e.g., in response to determining that the ramp out of current is complete), and ramp in current to the EPAS motor in response to detecting that the auto stop-start engine has successfully restarted based on the stall recovery attempt. The amount of stored energy consumed by the EPAS motor of the vehicle is accordingly reduced (e.g., minimized) throughout the stall recovery process, which advantageously increases the amount of stored energy available to the starter of the vehicle.

The disclosed methods and apparatus may also advantageously ramp out current from, and/or ramp in current to, the EPAS motor accordingly to ramp out and/or ramp in rates that reduce (e.g., minimize) occurrences of voltage flair and/or steering wheel jerk in connection with the stall recovery process. As a result of the aforementioned advantages and/or benefits, the disclosed methods and apparatus for controlling an EPAS motor in response to detecting engine stall while restarting an auto stop-start engine reduce drivability, performance and/or quality issues associated with the vehicle, and improve the level of customer (e.g., driver) satisfaction associated with the experience of driving the vehicle.

In some examples, an apparatus is disclosed. In some disclosed examples, the apparatus comprises a controller. In some disclosed examples, the controller is to ramp out current from an EPAS motor in response to detecting that an auto stop-start engine is stalled. In some disclosed examples, the controller is to invoke a stall recovery attempt at the auto stop-start engine in response to the ramp out of current. In some disclosed examples, the controller is to ramp in current to the EPAS motor in response to detecting that the auto stop-start engine has been successfully restarted based on the stall recovery attempt.

In some disclosed examples of the apparatus, the controller is to invoke the stall recovery attempt in response to detecting that the ramp out of current from the EPAS motor is complete.

In some disclosed examples of the apparatus, the controller is to ramp out current from the EPAS motor in response to detecting that the auto stop-start engine has stalled while attempting to restart from an auto stopped engine state.

In some disclosed examples of the apparatus, the controller is to ramp out current from the EPAS motor according to a ramp out rate. In some disclosed examples, the ramp out rate is configured to reduce steering wheel jerk associated with the ramp out. In some disclosed examples, the ramp out rate is less than or equal to forty amps per second.

In some disclosed examples of the apparatus, the controller is to ramp in current to the EPAS motor according to a ramp in rate. In some disclosed examples, the ramp in rate is configured to reduce steering wheel jerk associated with the ramp in. In some disclosed examples, the ramp in rate is less than or equal to forty amps per second.

In some disclosed examples of the apparatus, the stall recovery attempt is a first stall recovery attempt. In some disclosed examples of the apparatus, the controller is to determine whether to invoke a second stall recovery attempt in response to detecting that the auto stop-start engine has stalled based on the first stall recovery attempt. In some disclosed examples, the controller is to determine whether to invoke the second stall recovery attempt based on determining whether a stall recovery attempt timer associated with the first stall recovery attempt has expired. In some disclosed examples, the controller is to determine whether to invoke the second stall recovery attempt based on determining whether an attempt count of a stall recovery attempt counter associated with the first stall recovery attempt satisfies a stall recovery attempt threshold.

In some examples, a method is disclosed. In some disclosed examples, the method comprises ramping out current from an EPAS motor, by executing one or more instructions via a controller, in response to detecting that an auto stop-start engine is stalled. In some disclosed examples, the method comprises invoking a stall recovery attempt at the auto stop-start engine, by executing one or more instructions via the controller, in response to the ramping out of current. In some disclosed examples, the method comprises ramping in current to the EPAS motor, by executing one or more instructions via the controller, in response to detecting that the auto stop-start engine has been successfully restarted based on the stall recovery attempt.

In some disclosed examples of the method, the invoking of the stall recovery attempt is in response to detecting that the ramping out of current from the EPAS motor is complete.

In some disclosed examples of the method, the ramping out of current from the EPAS motor is in response to detecting that the auto stop-start engine has stalled while attempting to restart from an auto stopped engine state.

In some disclosed examples of the method, the ramping out of current from the EPAS motor is according to a ramp out rate. In some disclosed examples, the ramp out rate is configured to reduce steering wheel jerk associated with the ramp out. In some disclosed examples, the ramp out rate is less than or equal to forty amps per second.

In some disclosed examples of the method, the ramping in of current to the EPAS motor is according to a ramp in rate. In some disclosed examples, the ramp in rate is configured to reduce steering wheel jerk associated with the ramp in. In some disclosed examples, the ramp in rate is less than or equal to forty amps per second.

In some disclosed examples of the method, the stall recovery attempt is a first stall recovery attempt. In some disclosed examples, the method further comprises determining whether to invoke a second stall recovery attempt in response to detecting that the auto stop-start engine has stalled based on the first stall recovery attempt. In some disclosed examples, the determining of whether to invoke the second stall recovery attempt is based on determining whether a stall recovery attempt timer associated with the first stall recovery attempt has expired. In some disclosed examples, the determining of whether to invoke the second stall recovery attempt is based on determining whether an attempt count of a stall recovery attempt counter associated with the first stall recovery attempt satisfies a stall recovery attempt threshold.

In some examples, a non-transitory machine-readable storage medium comprising instructions is disclosed. In some disclosed examples, the instructions, when executed, cause a controller to ramp out current from an EPAS motor in response to detecting that an auto stop-start engine is stalled. In some disclosed examples, the instructions, when executed, cause the controller to invoke a stall recovery attempt at the auto stop-start engine in response to the ramp out of current. In some disclosed examples, the instructions, when executed, cause the controller to ramp in current to the EPAS motor in response to detecting that the auto stop-start engine has been successfully restarted based on the stall recovery attempt.

In some disclosed examples of the non-transitory machine-readable storage medium, the instructions, when executed, cause the controller to invoke the stall recovery attempt in response to detecting that the ramp out of current from the EPAS motor is complete.

In some disclosed examples of the non-transitory machine-readable storage medium, the instructions, when executed, cause the controller to ramp out current from the EPAS motor in response to detecting that the auto stop-start engine has stalled while attempting to restart from an auto stopped engine state.

In some disclosed examples of the non-transitory machine-readable storage medium, the instructions, when executed, cause the controller to ramp out current from the EPAS motor according to a ramp out rate. In some disclosed examples, the ramp out rate is configured to reduce steering wheel jerk associated with the ramp out. In some disclosed examples, the ramp out rate is less than or equal to forty amps per second.

In some disclosed examples of the non-transitory machine-readable storage medium, the instructions, when executed, cause the controller to ramp in current to the EPAS motor according to a ramp in rate. In some disclosed examples, the ramp in rate is configured to reduce steering wheel jerk associated with the ramp in. In some disclosed examples, the ramp in rate is less than or equal to forty amps per second.

In some disclosed examples of the non-transitory machine-readable storage medium, the stall recovery attempt is a first stall recovery attempt. In some disclosed examples of the non-transitory machine-readable storage medium, the instructions, when executed, cause the controller to determine whether to invoke a second stall recovery attempt in response to detecting that the auto stop-start engine has stalled based on the first stall recovery attempt. In some disclosed examples, the instructions, when executed, cause the controller to determine whether to invoke the second stall recovery attempt based on determining whether a stall recovery attempt timer associated with the first stall recovery attempt has expired. In some disclosed examples, the instructions, when executed, cause the controller to determine whether to invoke the second stall recovery attempt based on determining whether an attempt count of a stall recovery attempt counter associated with the first stall recovery attempt satisfies a stall recovery attempt threshold Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a controller configured to:
ramp out current from an electronic power assisted steering (EPAS) motor in response to detecting that an auto stop-start engine has stalled while the auto stop-start engine is re-cranking from an auto stopped engine state;
invoke a first stall recovery attempt at the auto stop-start engine in response to the ramp out of current, wherein the invoking of the first stall recovery attempt increases an attempt count of a stall recovery attempt counter and commences a stall recovery attempt timer;
invoke a second stall recovery attempt at the auto stop-start engine in response to detecting that the auto stop-start engine has stalled in response to the first stall recovery attempt, that the stall recovery attempt timer has expired, and that the stall recovery attempt counter has not exceeded a stall recovery attempt counter threshold; and
ramp in current to the EPAS motor in response to detecting that the auto stop-start engine has been successfully restarted based on the second stall recovery attempt.

2. The apparatus of claim 1, wherein the controller is configured to invoke the first stall recovery attempt in response to detecting that the ramp out of current from the EPAS motor is complete.

3. The apparatus of claim 1, wherein the controller is configured to ramp out current from the EPAS motor according to a ramp out rate, the ramp out rate being configured to reduce steering wheel jerk associated with the ramp out.

4. The apparatus of claim 3, wherein the ramp out rate is less than or equal to forty amps per second.

5. The apparatus of claim 1, wherein the controller is configured to ramp in current to the EPAS motor according to a ramp in rate, the ramp in rate being configured to reduce steering wheel jerk associated with the ramp in.

6. The apparatus of claim 5, wherein the ramp in rate is less than or equal to forty amps per second.

7. The apparatus of claim 1, wherein the invoking of the second stall recovery attempt resets the stall recovery attempt timer and increases the attempt count of the stall recovery attempt counter.

8. A method comprising:
ramping out current from an electronic power assisted steering (EPAS) motor, by executing one or more instructions via a controller, in response to detecting that an auto stop-start engine has stalled while the auto stop-start engine is re-cranking from an auto stopped engine state;
invoking a first stall recovery attempt at the auto stop-start engine, by executing one or more instructions via the controller, in response to the ramping out of current, wherein the invoking of the first stall recovery attempt increases an attempt count of a stall recovery attempt counter and commences a stall recovery attempt timer;

invoking a second stall recovery attempt at the auto stop-start engine, by executing one or more instructions via the controller, in response to detecting that the auto stop-start engine has stalled in response to the first stall recovery attempt, that the stall recovery attempt timer has expired, and that the stall recovery attempt counter has not exceeded a stall recovery attempt counter threshold; and ramping in current to the EPAS motor, by executing one or more instructions via the controller, in response to detecting that the auto stop-start engine has been successfully restarted based on the second stall recovery attempt.

9. The method of claim 8, wherein the invoking of the first stall recovery attempt is in response to detecting that the ramping out of current from the EPAS motor is complete.

10. The method of claim 8, wherein the ramping out of current from the EPAS motor is according to a ramp out rate, the ramp out rate being configured to reduce steering wheel jerk associated with the ramp out.

11. The method of claim 10, wherein the ramp out rate is less than or equal to forty amps per second.

12. The method of claim 8, wherein the ramping in of current to the EPAS motor is according to a ramp in rate, the ramp in rate being configured to reduce steering wheel jerk associated with the ramp in.

13. The method of claim 12, wherein the ramp in rate is less than or equal to forty amps per second.

14. The method of claim 8, wherein the invoking of the second stall recovery attempt resets the stall recovery attempt timer and increases the attempt count of the stall recovery attempt counter.

15. A non-transitory machine-readable storage medium comprising instructions that, when executed, cause a controller to at least:

ramp out current from an electronic power assisted steering (EPAS) motor in response to detecting that an auto stop-start engine has stalled while the auto stop-start engine is re-cranking from an auto stopped engine state;

invoke a first stall recovery attempt at the auto stop-start engine in response to the ramp out of current, wherein the invoking of the first stall recovery attempt increases an attempt count of a stall recovery attempt counter and commences a stall recovery attempt timer;

invoke a second stall recovery attempt at the auto stop-start engine in response to detecting that the auto stop-start engine has stalled in response to the first stall recovery attempt, that the stall recovery attempt timer has expired, and that the stall recovery attempt counter has not exceeded a stall recovery attempt counter threshold; and ramp in current to the EPAS motor in response to detecting that the auto stop-start engine has been successfully restarted based on the second stall recovery attempt.

16. The non-transitory machine-readable storage medium of claim 15, wherein the instructions, when executed, cause the controller to invoke the first stall recovery attempt in response to detecting that the ramp out of current from the EPAS motor is complete.

17. The non-transitory machine-readable storage medium of claim 15, wherein the instructions, when executed, cause the controller to ramp out current from the EPAS motor according to a ramp out rate, the ramp out rate being configured to reduce steering wheel jerk associated with the ramp out.

18. The non-transitory machine-readable storage medium of claim 17, wherein the ramp out rate is less than or equal to forty amps per second.

19. The non-transitory machine-readable storage medium of claim 15, wherein the instructions, when executed, cause the controller to ramp in current to the EPAS motor according to a ramp in rate, the ramp in rate being configured to reduce steering wheel jerk associated with the ramp in.

20. The non-transitory machine-readable storage medium of claim 19, wherein the ramp in rate is less than or equal to forty amps per second.

* * * * *